(12) United States Patent
Suzuki et al.

(10) Patent No.: US 8,662,589 B2
(45) Date of Patent: Mar. 4, 2014

(54) VEHICLE SEAT

(75) Inventors: Akira Suzuki, Aichi-ken (JP); Shogo Ishii, Kariya (JP); Kazuhisa Isshiki, Kariya (JP)

(73) Assignees: Toyota Boshoku Kabushiki Kaisha, Aichi-Ken (JP); Toyota Shatai Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/332,802

(22) Filed: Dec. 21, 2011

(65) Prior Publication Data

US 2012/0169101 A1 Jul. 5, 2012

(30) Foreign Application Priority Data

Dec. 22, 2010 (JP) ................................ 2010-286100

(51) Int. Cl.
*B60N 2/20* (2006.01)
*A47C 7/02* (2006.01)

(52) U.S. Cl.
USPC ................................ 297/378.12; 297/452.38

(58) Field of Classification Search
USPC ............................. 297/378.12, 463.1, 452.38
See application file for complete search history.

(56) References Cited

U.S. PATENT DOCUMENTS

| | | | |
|---|---|---|---|
| 4,146,267 A | | 3/1979 | Mori et al. |
| 5,288,133 A | * | 2/1994 | Mizushima et al. ..... 297/452.38 |
| 5,390,981 A | * | 2/1995 | Griswold ................. 297/378.12 |
| 6,149,241 A | * | 11/2000 | Waku et al. ................. 297/463.2 |
| 6,474,741 B2 | * | 11/2002 | Kamida et al. ........... 297/378.12 |
| 7,828,382 B2 | * | 11/2010 | Ozeki et al. .................... 297/341 |
| 7,938,490 B2 | * | 5/2011 | Ishijima et al. ................ 297/358 |
| 8,182,041 B2 | * | 5/2012 | Moegling et al. ........ 297/378.12 |
| 8,191,968 B2 | * | 6/2012 | Hazlewood ............. 297/378.12 |
| 2007/0046091 A1 | * | 3/2007 | Day et al. ................. 297/378.12 |
| 2010/0090515 A1 | * | 4/2010 | Yamazaki et al. ......... 297/463.1 |

FOREIGN PATENT DOCUMENTS

| | | |
|---|---|---|
| CN | 101722879 | 6/2010 |
| JP | 5-29439 | 4/1993 |
| JP | 3581574 | 7/2004 |
| JP | 2007-131199 | 5/2007 |
| JP | 2008-295613 | 12/2008 |

OTHER PUBLICATIONS

Japan Office action, dated Dec. 6, 2012 along with an english translation thereof.

Chinese Office action, dated Nov. 22, 2013 along with an english translation thereof.

* cited by examiner

*Primary Examiner* — Milton Nelson, Jr.
(74) *Attorney, Agent, or Firm* — Greenblum & Berstein, P.L.C.

(57) ABSTRACT

A vehicle seat including: a tilting lever provided to an outer part of a seat main body, and by operating the tilting lever, a seat back can be tilted to a position of an upper surface of a seat cushion, wherein the tilting lever is arranged within an inwardly recessed space that is formed to a shield covering an outer part of the seat cushion, and an input movement of an operation to the tilting lever is completed within the recessed space.

7 Claims, 9 Drawing Sheets

VEHICLE SEAT

CROSS-REFERENCE TO RELATED APPLICATIONS

This application claims priority from Japanese Patent Application No. 2010-286100 filed on Dec. 22, 2010, the entire contents of which are incorporated herein by reference.

TECHNICAL FIELD

Aspects of the present invention relate to a vehicle seat. More specifically, aspects of the present invention relate to a vehicle seat including a tilting lever provided to an outer part of a seat main body, and by operating the tilting lever, a seat back can be tilted to a position of an upper surface of a seat cushion.

BACKGROUND

Related-art (for example, Japanese Patent Publication No. 3581574) shows a vehicle seat in which a greatly tilting lever is operated to tilt a seat back to a position of an upper surface of a seat cushion. The greatly tilting lever is arranged on an outer part of the seat cushion and by pulling up the greatly tilting lever, the seat back can be tilted to a greatly tilted position.

However, in the vehicle seat according to related-art, the greatly tilting lever is provided immediately below a reclining device and a shield is provided to cover an outer part of the seat cushion. Further, the greatly tilting lever protrudes forward from a portion of the shield which rises upward to cover the reclining device. Accordingly, an operability of the greatly tilting lever is enhanced. However, in a case when the seat back is greatly tilted, there is a problem that the greatly tilting lever or a user's hand operating the greatly tilting lever may interfere with the seat back that is greatly tilted. The present invention has been made to solve the above problem. It is an object of the present invention to provide a vehicle seat capable of preventing the greatly tilting lever or a user's hand operating the tilting lever from interfering with the seat back that is greatly tilted, while arranging the greatly tilting lever so as to enhance operability.

SUMMARY

In order to solve the above problem, the vehicle seat according to the present invention has the following configuration:

According to an aspect of the present invention, there is provided a vehicle seat including: a tilting lever provided to an outer part of a seat main body, and by operating the tilting lever, a seat back can be tilted to a position of an upper surface of a seat cushion, wherein the tilting lever is arranged within an inwardly recessed space that is formed to a shield covering an outer part of the seat cushion, and an input movement of an operation applied to the tilting lever is completed within the recessed space.

According to another aspect of the invention, there is provided a vehicle seat including: a seat main body including, a seat cushion, and a seat back; a tilting lever provided to an outer part of the seat main body, the tilting lever including an operating part; and a shield covering an outer part of the seat cushion, wherein the seat back is configured to be tilted to a position of an upper surface of the seat cushion by operating the operating part of the tilting lever, and wherein the operating part of the tilting lever is arranged within an inwardly recessed space that is formed to the shield, and the operating part of the tilting lever moves within the recessed space in response to an operation force applied to the operating part of the tilting lever.

DETAILED DESCRIPTION

Hereinafter, exemplary embodiments of the present invention will be described by referring to the accompanying drawings.

Figure 1:
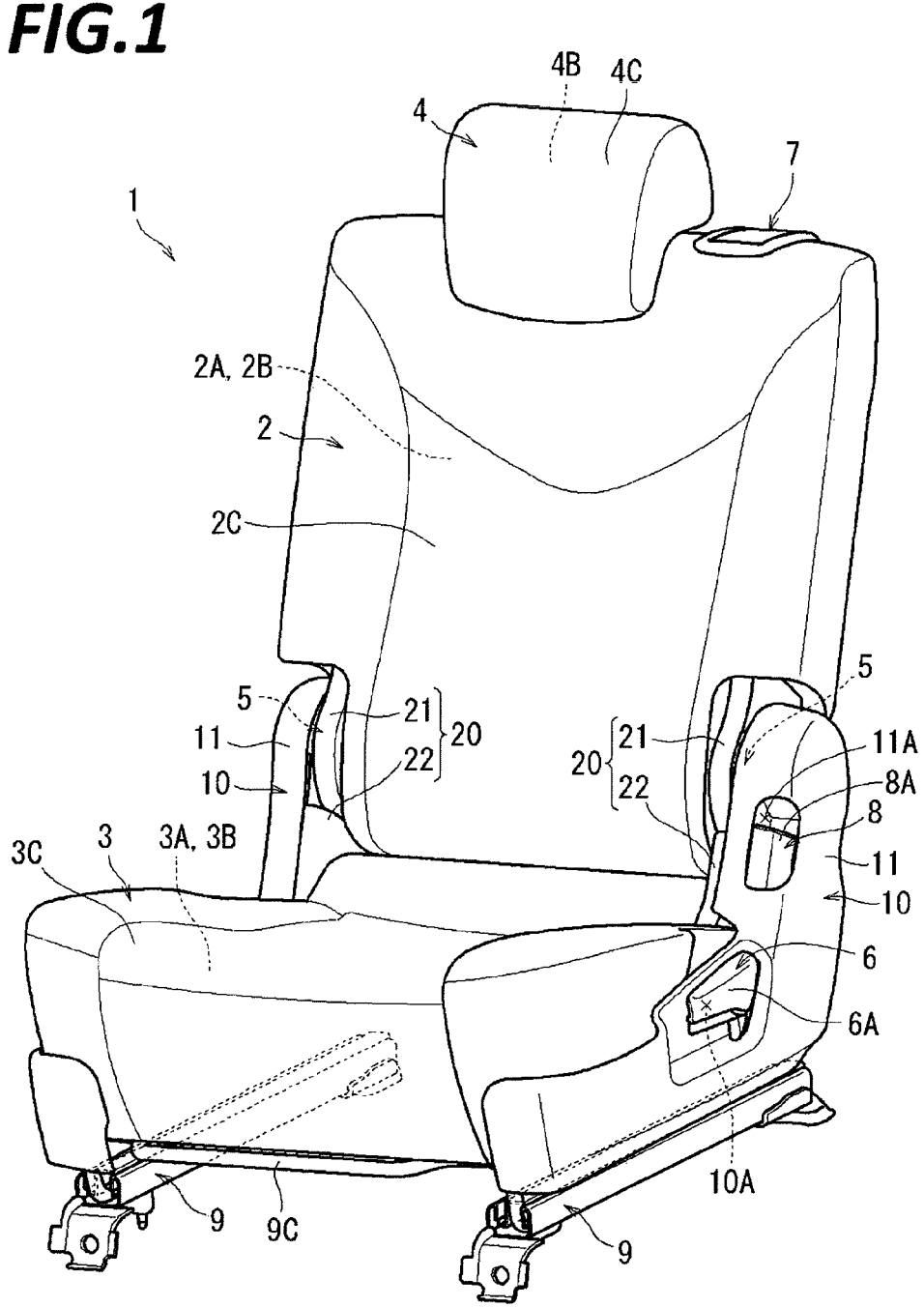
FIG. 1 is a perspective view illustrating an external appearance of a vehicle seat according to a first exemplary embodiment.

Firstly, configuration of a vehicle seat according to a first exemplary embodiment will be explained by referring to FIGS. 1 to 9. As shown in FIG. 1, the vehicle seat of $_{the}{}^{first}$ exemplary embodiment $^{is}$ provided with a seat main body 1 which has a seat back 2 serving as a backrest, a seat cushion 3 serving as a seating part, and a head rest 4 serving as a head support. Cushion pads 2B, 3B and 4B are respectively provided at an inside of the seat back 2, the seat cushion 3 and the head rest 4 so as to cover a framework structure thereof and the entire surfaces of the cushion pads are covered with fabric covers 2C, 3C and 4C.

Figure 2:
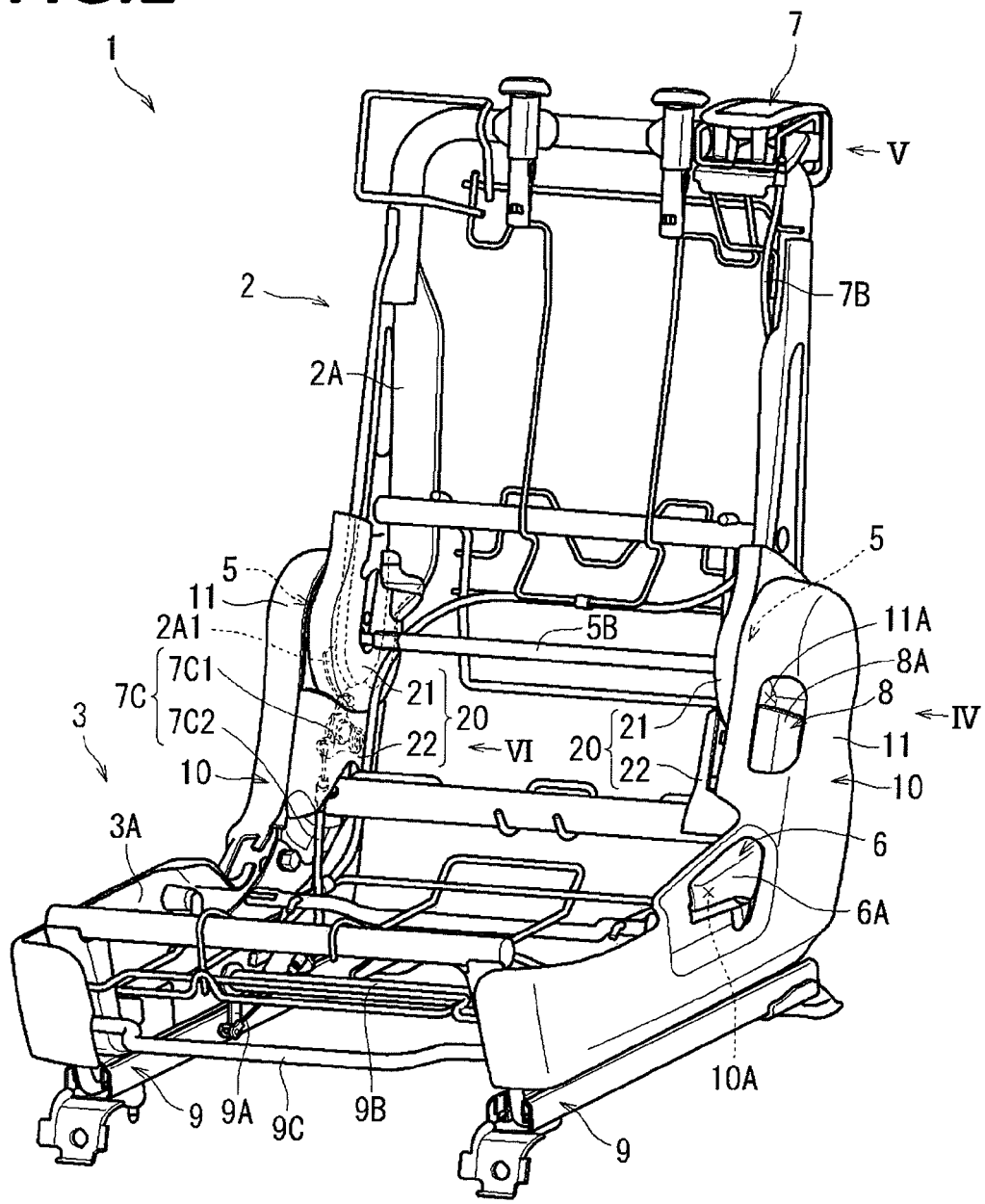
FIG. 2 is an exploded perspective view illustrating the vehicle seat.
Figure 3:
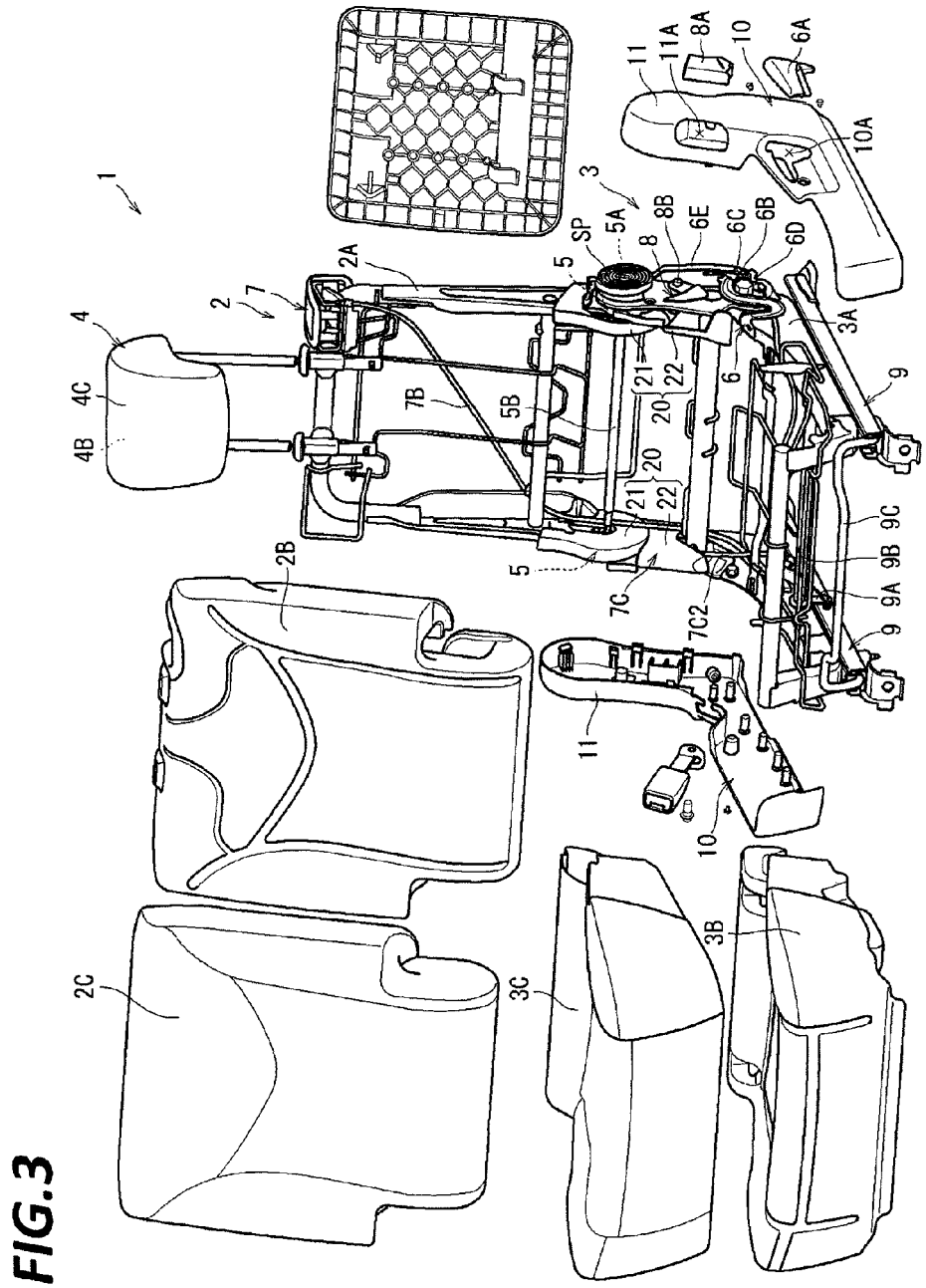
FIG. 3 is an exploded perspective view illustrating a main part of a seat framework.

As shown in FIGS. 2 and 3, the seat back 2 includes a back frame 2A constituting the framework thereof and the seat cushion 3 includes a cushion frame 3A constituting the framework thereof. Left and right lower ends of the back frame 2A are connected to left and right rear ends of the cushion frame 3A with reclining devices 5, which serve as a rotating shaft that can be rotatably locked, interposed therebetween. Normally, each of the reclining devices 5 is maintained in a rotation locking state where the angle of the seat back 2 is fixed. When a release arm 5A, which is connected to an operation shaft passing through a center portion of the reclining device, is operated to rotate, the rotation locking sate of the reclining device can be released.

The operation for releasing the rotation locking sate of each reclining device 5 can be performed by operating a release lever 6 which is provided on a side portion of a door side (an outer side) of the seat cushion 3 or a shoulder lever 7 which is provided on a shoulder portion of the door side (the outer side) of the seat back 2. According to this configuration, the seat back 2 is normally maintained in a fixed state where the angle of the seat back relative to the seat cushion 3 is fixed. When the release lever 6 or the shoulder lever 7 is operated, the fixed state of the seat back can be released. In this case, the reclining devices 5 are respectively connected to each other by a connecting rod 5B so that the actuation states of the reclining devices are adapted to be synchronized with each other. Accordingly, when the rotation locking state of one reclining device 5 is released, the rotation locking states of the other reclining device 5 is also caused to be released.

Figure 4:
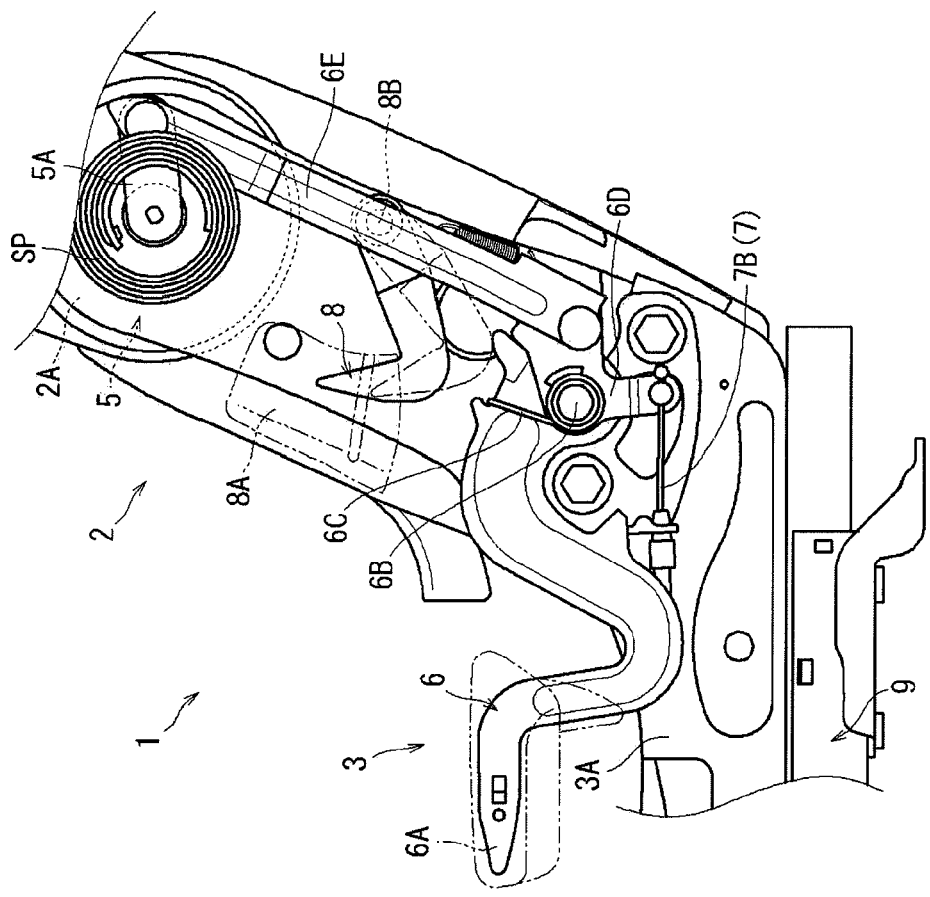
FIG. 4 is a side view as viewed from an arrow IV of FIG. 2.

As shown in FIG. 4, the release lever 6 is rotatably coupled to the side portion of the outer portion of the cushion frame 3A by a connecting shaft 6B. The release lever 6 is configured as a pull-up type structure. Specifically, during a normal condition, the release lever 6 is maintained in an initial state where the release lever is not yet pulled up and latched by a biasing force of a spring 6C which is hooked between the connecting shaft 6B and the release lever 6. The release lever 6 is provided with a resin operating part 6A at a leading end thereof. As a user grips and pulls up the operating part 6A, the release lever 6 is rotationally operated by an operational link 6D rotatably coupled to the side portion of the outer portion of the cushion frame 3A. In this way, a driven link 6E, which connects the operational link 6D and a release arm 5A of the reclining device 5, is pressed down so that the release arm 5A is rotationally operated.

Figure 5:
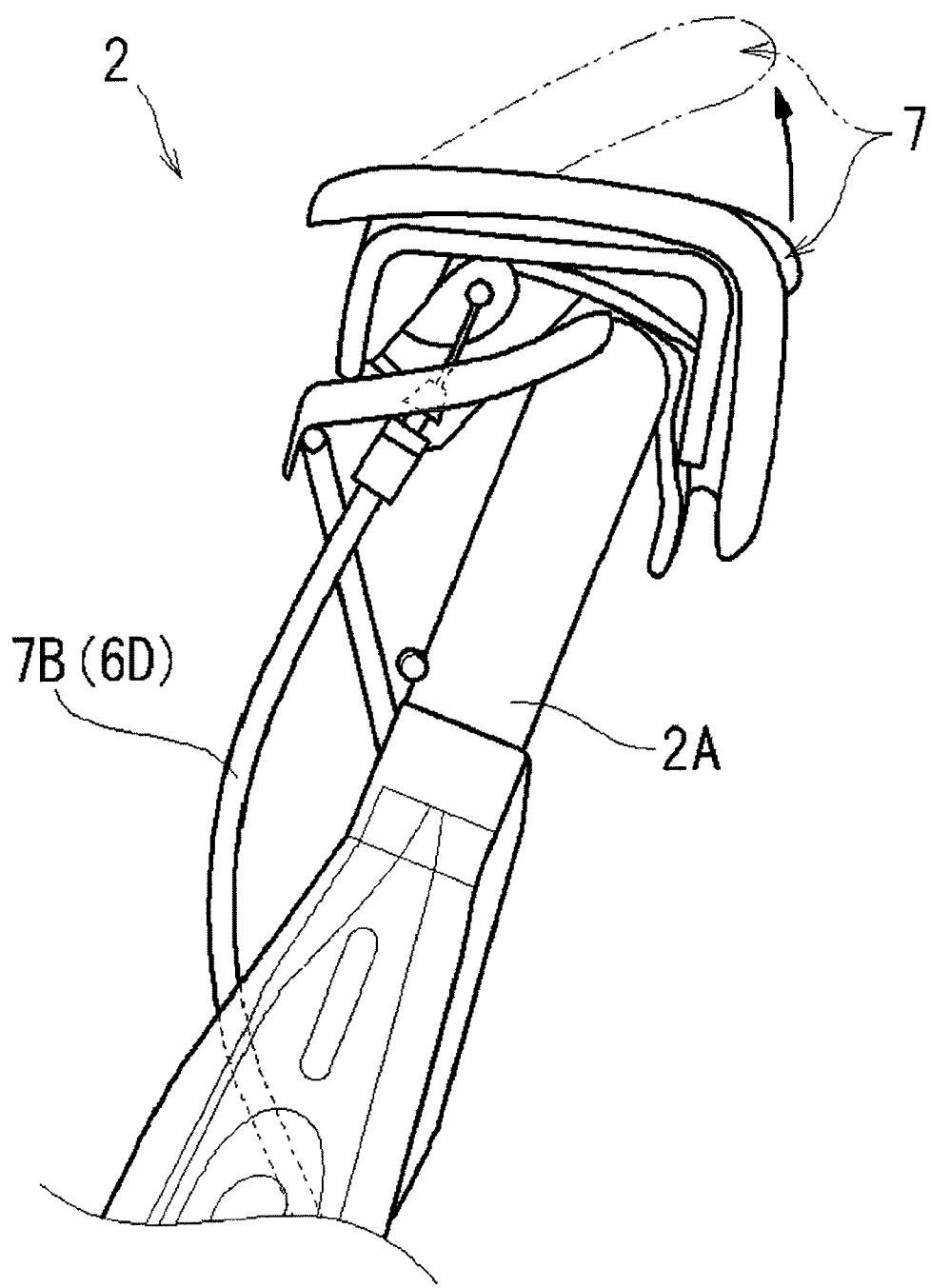
FIG. 5 is a side view as viewed from an arrow V of FIG. 2.

Further, the shoulder lever 7 is mounted on the shoulder portion of the outer side of the back frame 2A and is connected to the operational link 6D by a cable 7B (see, FIGS. 4 and 5). As the shoulder lever 7 is erected toward the front side of the seat, the shoulder lever directly rotates the operational link 6D via the cable 7B. In this case, similar to when the release lever 6 is operated, the release arm 5A can be rotated downward through the driven link 6E.

Figure 6:
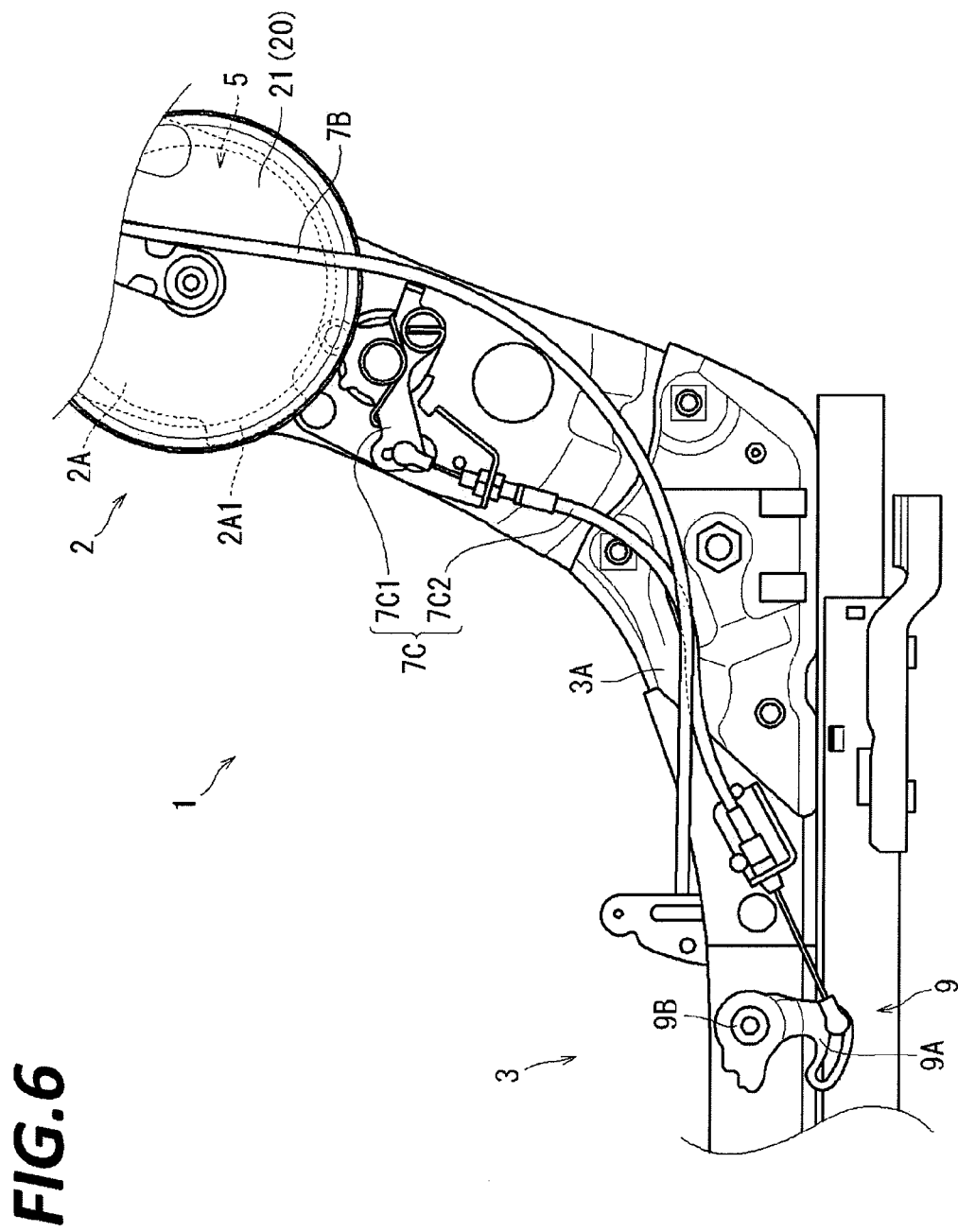
FIG. 6 is a side view as viewed from an arrow VI of FIG. 2.
Figure 7:
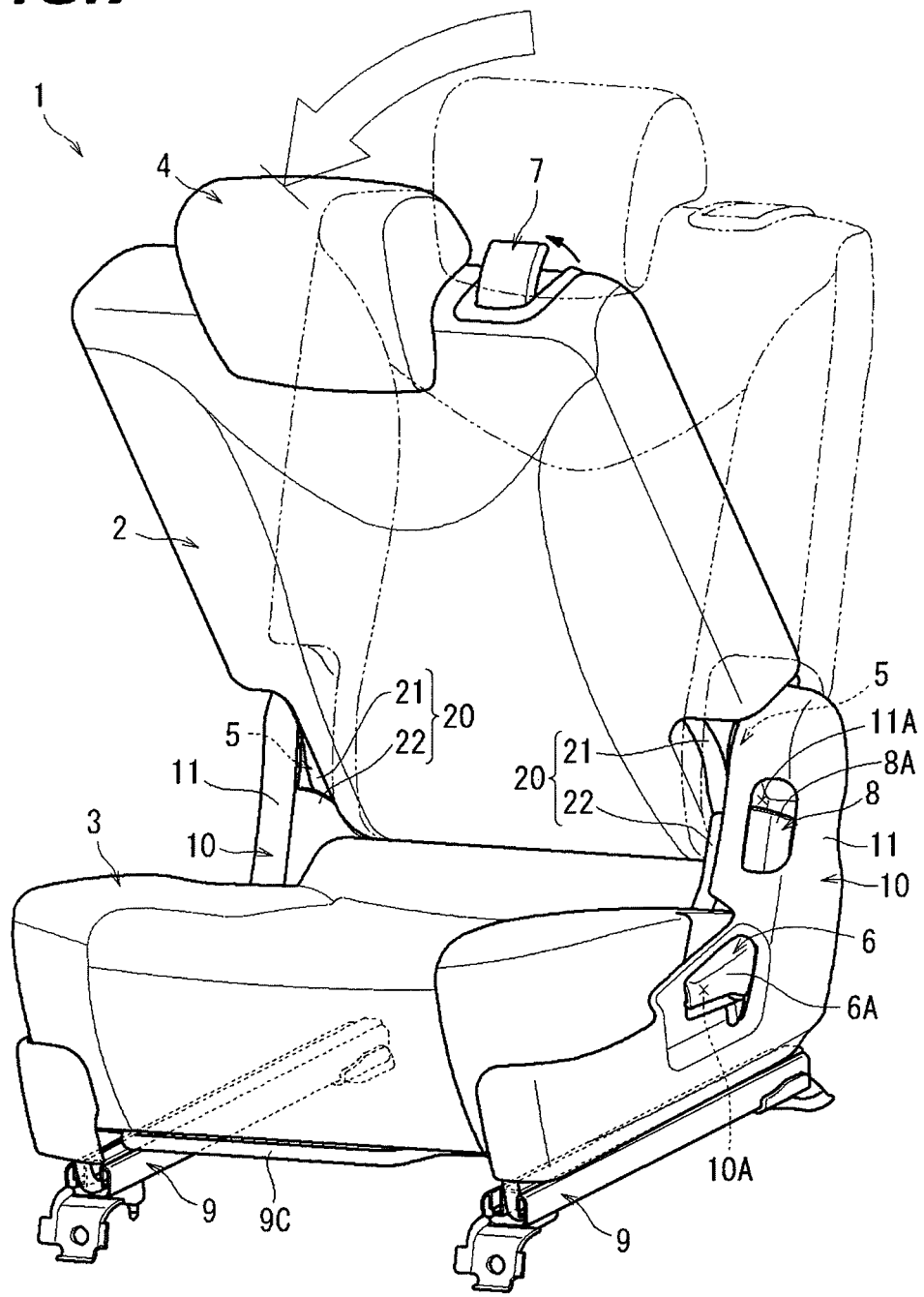
FIG. 7 is a side view illustrating a state where a shoulder lever is operated and a seat back is tilted.

As shown in FIGS. 2 and 3, a spring SP is hooked between both side portions of the connecting part of the seat back 2 and the seat cushion 3. In a normal condition, the spring applies a biasing force for tilting and rotating the seat back 2 forwards. Accordingly, the rotation locking state of the seat back 2 is released and the seat back 2 is tilted forwards by the biasing force of the spring SP. As a result, the seat back 2 is tilted and latched to a forward inclined position shown in FIG. 7. As shown in FIGS. 2, 3 and 6, a release mechanism 7C is provided on the connecting portion of the seat back 2 and the seat cushion 3 in the inner side of the seat main body 1. As the seat back 2 is tilted from an erected position to the forward inclined position, the release mechanism 7C releases a slide lock state of a slider device 9 which slidably connects the seat main body 1 to a vehicle floor.

As shown in FIG. 6, the release mechanism 7C includes an operational link 70 which is rotatably coupled to an inner side portion of the cushion frame 3A and a cable 7C2 which connects the operational link 7C1 and a release arm 9A connected to a lock mechanism (not-illustrated) of the slider device 9. As the seat back 2 is tilted from an erected position to the forward inclined position, the operational link 7C1 is turned by a protruding kick portion 2A1 (FIGS. 2 and 3) integrally formed on the back frame 2A, thereby rotating the release arm 9A via the cable 7C2. As a result, the slide lock state of the slider device 9 is released by the release mechanism 7C. By this release operation, the seat main body 1 can slidably move toward the front of the vehicle in a state where the seat back 2 is in the forward inclined position. Consequently, the boarding space for the rear seat can be broadened.

The slider device 9 includes a pair of left and right slide rail parts and lock mechanisms (not-illustrated) are respectively provided on each of the slide rail parts. The lock mechanisms are connected to each other by a connecting rod 9B so that the actuation states thereof are adapted to be synchronized with each other. Accordingly, when the slide lock state of one lock mechanism is released, the slide lock state of the other lock mechanism is caused to be released. Further, it is also possible to release the slide lock state of the slider device 9 by pulling up a slide lock release lever 9C which is connected to each lock mechanism (not-illustrated) and extends to a front lower part of the seat cushion 3.

Figure 8:
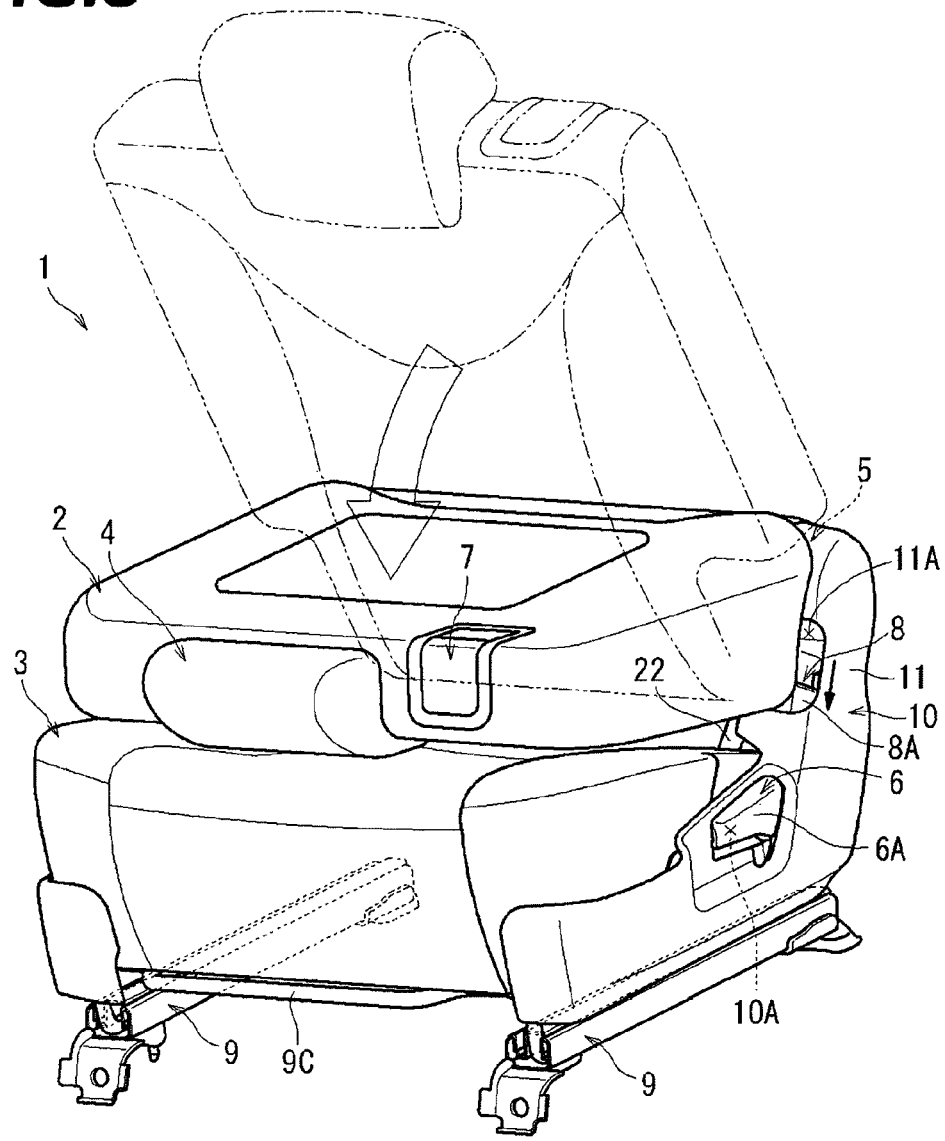
FIG. 8 is a side view illustrating a state where a push down lever is operated and the seat back is greatly tilted.
Figure 9:
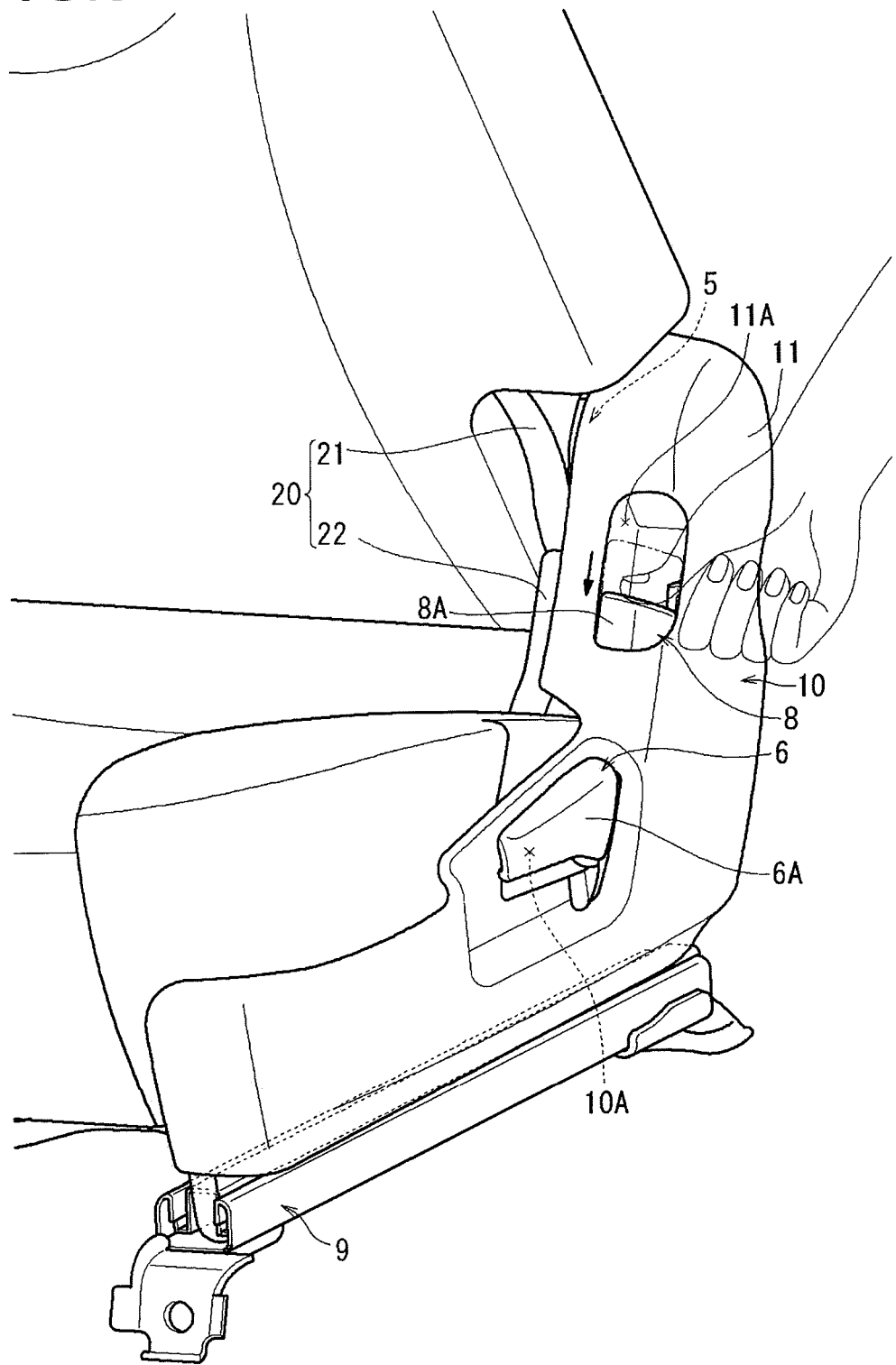
FIG. 9 is a perspective view illustrating a state where the push down lever is pushed and operated.

Further, as shown in FIG. 9, by pushing down a push down lever 8, which is provided at the side portion of the outer part of the seat cushion 3, the seat back 2 tilted to the forward inclined position can be released from a latched state where the seat back is latched to the forward inclined position, so that the seat back can be greatly tilted to a position of the upper surface of the seat cushion 3, as shown in FIG. 8. In this case, the push down lever 8 corresponds to the tilting lever which constitutes a main part of the present invention. As shown in FIGS. 2 and 3, the push down lever 8 is rotatably coupled to a rear edge portion of the outer part of the cushion frame 3A by a connecting shaft 8B. The push down lever 8 is configured as a push-down type structure. Specifically, during a normal condition, the push down lever 8 is maintained in an initial state where the push down lever is not yet pushed down and latched by a biasing force of a spring (not-illustrated) which is hooked between the connecting shaft 8B and the push down lever 8. A resin operating part 8A is provided at a leading end of the push down lever 8. As shown in FIG. 9, by a user gripping and pushing down the operating part 8A, the seat back 2 can be further tilted from a state where the seat back is tilted and latched to the forward inclined position by the operation of the shoulder lever 7 to a position of the upper surface of the seat cushion 3 (see FIG. 8).

Specifically, as shown in FIG. 4, the push down lever 8 is integrally formed with the connecting shaft 8B which is rotatably coupled to the side portion of the outer portion of the cushion frame 3A. More specifically, the connecting shaft 8B is provided to penetrate through the cushion frame 3A in a thickness direction thereof. A latch arm (not-illustrated) including a latch pin (not-illustrated) is integrally coupled to a front end of an inner side of the connecting shaft 8B. The latch pin is configured to contact the seat back 2 and to latch the forward tilting rotation of the seat back 2 in the forward inclined position. When the push down lever 8 is not yet pushed down and latched in its initial position by a biasing force of a spring (not-illustrated), the rotating movement of the push down lever 8 in a direction opposite to the push down direction (a clockwise direction in FIG. 4) is restricted. In this state, if the seat back 2 is rotated toward the front tilting position, a protruding latch part (not-illustrated) formed on the side part of the outer portion of the back frame 2 contacts with the latch pin to latch the forward tilting rotation of the seat back 2 in the forward inclined position shown in FIG. 7.

Further, by latching the seat back 2 in the forward inclined position as mentioned above and then operating the push down lever 8, the latch pin (not-illustrated) latching the seat back 2 is released from the latched state with the latch part (not-illustrated) of the seat back 2 in accordance with the operation of the push down lever 8. Accordingly, the latched state of the seat back 2 can be released. In this way, the seat back 2 can be further tilted forward from the forward inclined position (see FIG. 8) to a position of the upper surface of the seat cushion 3 so that the seat back overlaps the seat cushion.

Meanwhile, as shown in FIGS. 1 to 3, the operating parts 6A, 8A of the release lever 6 and the push down lever 8 are mounted on an outer part of the outer shield 10 covering the side portion of the outer part of the seat cushion 3 so as to be exposed. Specifically, the release lever 6 is arranged inside a first recessed space 10A formed on the outer part of the outer shield 10 and penetrates through a slit extending from an inner side of the first recessed space. The operating part 6A is provided at a leading end of the release lever 6 and arranged inside the first recessed space 10A. Similarly, the push down lever 8 is arranged inside a second recessed space 11A formed on the outer part of the outer shield 10 and penetrates through a slit extending from an inner side of the second recessed space. The operating part 8A is provided at a leading end of the push down lever 8 and arranged inside the second recessed space 11A. The outer shield 10 corresponds to the shield of the present invention and the second recessed space 11A corresponds to the recessed space of the present invention.

The seat cushion 3 has left and right outer parts which are covered with the resin outer shields 10 from the outside and left and right inner parts which are covered with resin inner shields 20 from the inside. Each inner shield 20 includes an upper shield 21 which is attached to the inner part of the back frame 2A and a lower shield 22 which is attached to the inner part of the cushion frame 3A. Meanwhile, each outer shield 10 has an L-shaped configuration. That is, the outer shields 10 respectively include cover members which are attached to left and right outer parts of the cushion frame 3A to cover the outer part of the cushion frame 3A and cover members (upward extension portions 11) which extend upwards from left and right rear edges of the cushion frame 3A to cover a part thereof connected to the back frame 2A by the reclining device 5.

The outer shield 10 is mounted on the side portion of the outer part of the seat cushion and is provided with the first recessed portion 10A. Specifically, the first recessed portion 10A is located adjacent to a user's lower lumbar region to be easily accessible by the user's hand, at a region that covers the outer part of the cushion frame 3A. The first recessed portion 10A opens outside and upside relative to the outer shield 10. Accordingly, by setting the operating part 6A of the release lever 6 inside the first recessed portion 10A, a user can insert his hand into the operating part 6A from the outside and pull up the operating part 6A to a position above the upper part of the first recessed space 10A.

Further, the upward extension portion 11 of the outer shield 10, which extends upward from the rear edge of the outer shield 10, is provided with the second recessed space 11 A at a front edge part thereof. The recessed space 11 a elongates in the height direction. The second recessed space 11A is opened at the front side and outside relative to the outer shield and is closed at the top side. Accordingly, by setting the operating part 8A of the push down lever 8 inside the second recessed space 11A, a user can insert his hand into an upper surface of the operating part 8A inside the second recessed space 11A from the outside and push down the operating part 8A. In this case, a moving distance of the operating part 8A pushed down by the push down lever 8 is limited to a range in which the upper surface of the operating part 8A can stay within the second recessed space 11A. By pushing down the push down lever 1 by the range, an operation (i.e., an operation for releasing the latched state of the latch pin (not-illustrated) from the latched part of the back frame 2A) for releasing the latched state of the seat back 2 in the forward inclined position is completed.

As such, by arranging the push down lever 8 inside the second recessed space 11A with top closed and completing a moving operation of the push down lever 8 within the second recessed portion 11A, a user's hand operating the push down lever 8 is still maintained within the second recessed space 11A after completing the moving operation and thus there is no fear that user's hand interferes with the seat back 2 that is tilted greatly. In this way, it is possible to prevent the push down lever 8 and user's hand operating the push down lever from interfering with the seat back 2 that is tilted greatly while arranging the push down lever 8 to allow a movement operation thereof to be completed within the second recessed space 11A so as to enhance operability.

Further, since the operating part 8A of the push down lever 8 is arranged inside the second recessed space 11A which is formed on the front edge part of the upward extension portion 11 of the outer shield 10, it is possible for a user to access and operate the push down lever 8 at an accessible level position while standing on outside of a boarding door spaced apart from the vehicle seat. Further, since the rotation center of the push down lever 8 is located in a rear edge part remote from an operating position (i.e., the second recessed space 11A) of the operating part 8A, an operational load required for pushing down the push down lever 8 can be reduced. Accordingly, the operability of the push down lever 8 can be further enhanced. In addition, since the push down lever 8 is arranged on the front edge part of the upward extension portion 11 of the outer shield 10, it is possible to eliminate a problem that when a person seating on a rear seat gets on and off, his hands or legs inadvertently contact and operate the push down lever 8. In addition, since the operation direction of the push down lever 8 is set to the downward direction, it is easy to apply an operational force on the push down lever 8. Accordingly, the operability of the push down lever 8 can be further enhanced.

Hereinabove, an aspect of the present invention has been described by way of an exemplary embodiment. However, the present invention is not limited to the exemplary embodiment and may be employed in other various exemplary embodiments. For example, although the second recessed space 11A corresponding to the recessed space of the present invention is provided on the outer shield 10 while being opened on the front side thereof in the above exemplary embodiment, the present invention is not limited thereto. The second recessed space may be formed while being closed on the front side and being opened only on the outside. By this configuration, since a user's hand cannot be inserted into the recessed space from the front side, it is possible to prevent user's hand from being interfered with the seat back 2 tilted greatly. Further, although the push down lever 8 which is configured to release the latched state of the seat back 2 in the forward inclined position and to tilt the seat back 2 to a greatly tilted position is used as the tilting lever in the above exemplary embodiment, the present invention is not limited thereto. A tilting lever which is configured to release the rotation locking state of the reclining device 5 and tilt the seat back 2 from a seating position to a greatly tilted position at once may also be used.

Further, the tilting lever of the present invention is not limited to a push down type operation structure mentioned in the above exemplary embodiment, but may employ other various operation structures such as a pull up operation type, a rotary operation type, a twist operation type, a straight slide operation type in a vertical or lateral direction and a push in or a pull out operation type in a width direction. Particularly, in the pull out operation type in a width direction, even if an input movement of an operation applied to the tilting lever goes beyond the recessed space, the tilting lever will not protrude from the recessed space in an upper side or a front side. Accordingly, the pull out operation type in a width direction also meets the requirement: "an input movement of an operation force is completed within the recessed space," which is a main feature of the present invention. Accordingly, it is possible to prevent a user's hand operating the tilting lever from interfering with the seat back tilted greatly.

What is claimed is:

1. A vehicle seat comprising:

a tilting lever provided at an outer part of a seat main body such that when the tilting lever is operated, a seat back can be tilted to a position of an upper surface of a seat cushion, wherein the tilting lever has a push-down type operation configuration and is arranged within an inwardly recessed space of a shield that covers an outer part of the seat cushion such that a straight downward input movement of an operation applied to the tilting lever is completed within the recessed space, and wherein when the tilting lever is operated, a downmost position of an upper surface of an operating part of the tilting lever is higher than the position of the upper surface of the seat cushion.

2. The vehicle seat according to claim 1, wherein the shield includes an upward extension portion which extends upward to cover an outer part of a reclining device that connects a lower end of the seat back with a rear end of the seat cushion, wherein the recessed space is provided at a front edge part of the upward extension portion, and wherein the tilting lever, which is arranged within the recessed space, is rotatably supported at a rear edge part of a frame of the seat cushion, the cushion frame being covered by the upward extension portion.

3. A vehicle seat comprising:

a tilting lever provided at an outer part of a seat main body such that when the tilting lever is operated, a seat back can be tilted to a position of an upper surface of a seat cushion, wherein an operating part of the tilting lever that receives an operating force is arranged within an inwardly recessed space of a shield covering an outer part of the seat cushion, and an operation of the operating part is completed within the recessed space, wherein the shield is provided at the outer part of the seat cushion and includes an upward extension portion that extends upward to cover an outer part of a reclining device that connects a lower end of the seat back with a rear end of the seat cushion, and the recessed space is provided at a front edge part of the upward extension portion, and wherein the tilting lever is rotatably supported at a rear edge part of a frame of the seat cushion, which is covered by the upward extension portion, and a front end portion of the tilting lever that connects to the operating part is bent upwards so as to be connected to the operating part from a lower side thereof, whereby the tilting lever has a push down type operation configuration in which the operating part is configured to be pushed straight downward within the recessed space.

4. A vehicle seat comprising:

a seat main body including,
   a seat cushion, and
   a seat back;

a tilting lever provided at an outer part of the seat main body and having a push-down type operation configuration, the tilting lever including an operating part; and a shield covering an outer part of the seat cushion, wherein the seat back is configured to be tilted to a position of an upper surface of the seat cushion by an operation of the operating part of the tilting lever, wherein the operating part of the tilting lever is arranged within an inwardly recessed space of the shield, and the operating part of the tilting lever is movable straight downward within the recessed space in response to an operation force applied to the operating part of the tilting lever, and wherein when the tilting lever is operated, a downmost position of an upper surface of the operating part of the tilting lever is higher than the position of the upper surface of the seat cushion.

5. The vehicle seat according to claim 4, wherein the operating part of the tilting lever is arranged within the recessed space in a front-rear direction.

6. The vehicle seat according to claim 4, further comprising a reclining device that connects a lower end of the seat back and a rear end of the seat cushion;

wherein the shield includes an upward extension portion which extends upward to cover an outer part of the reclining device, and wherein the recessed space is provided at a front edge part of the upward extension portion.

7. The vehicle seat according to claim 6, wherein the seat cushion includes a cushion frame, and wherein the tilting lever is rotatably supported at a rear edge part of the cushion frame which is covered by the upward extension portion.

* * * * *